No. 621,728. Patented Mar. 21, 1899.
R. A. WILLETT.
BRICK MACHINE.
(Application filed Nov. 16, 1896.)
(No Model.) 6 Sheets—Sheet 1.

Fig. 1.

WITNESSES:
Wm W. Shaw
Arthur F. Thompson.

INVENTOR
Robert A. Willett,
BY
Daniel A. Carpenter,
ATTORNEY.

No. 621,728. Patented Mar. 21, 1899.
R. A. WILLETT.
BRICK MACHINE.
(Application filed Nov. 16, 1896.)

(No Model.) 6 Sheets—Sheet 3.

Fig. 3.

WITNESSES:
Wm H. Shaw
Arthur F. Thompson

INVENTOR
Robert A. Willett
BY
Daniel A. Carpenter,
ATTORNEY.

No. 621,728. Patented Mar. 21, 1899.
R. A. WILLETT.
BRICK MACHINE.
(Application filed Nov. 16, 1896.)

(No Model.) 6 Sheets—Sheet 5.

Fig. 5.

WITNESSES:
Wm H Shaw
Arthur F. Thompson.

INVENTOR
Robert A. Willett,
BY
Daniel A. Carpenter
ATTORNEY.

No. 621,728. Patented Mar. 21, 1899.
R. A. WILLETT.
BRICK MACHINE.
(Application filed Nov. 16, 1896.)
(No Model.) 6 Sheets—Sheet 6.

WITNESSES:
Wm W Shaw
Arthur F. Thompson

INVENTOR
Robert A. Willett,
BY
Daniel A. Carpenter
ATTORNEY.

UNITED STATES PATENT OFFICE.

ROBERT A. WILLETT, OF NEW YORK, N. Y., ASSIGNOR TO THE HERCULES BRICK MACHINE COMPANY, OF NEW YORK.

BRICK-MACHINE.

SPECIFICATION forming part of Letters Patent No. 621,728, dated March 21, 1899.

Application filed November 16, 1896. Serial No. 612,172. (No model.)

*To all whom it may concern:*

Be it known that I, ROBERT A. WILLETT, of New York, (Brooklyn,) in the county of Kings and State of New York, have invented a certain new and useful Improvement in Brick-Machines, of which the following is a full, clear, and exact description, reference being made to the accompanying drawings, forming part of this specification.

This invention relates to improvements in machines which are employed in the manufacture of brick from dry or semidry clay to press the clay into the desired form; and the invention consists of a brick-machine comprising one or more of the various parts or combinations of parts described and claimed herein.

On the accompanying sheets of drawings, Fig. 6, a plan of the molds, pieces being cut out of the frame, as appears near the left of the figure; Fig. 7, a front view of a portion and a vertical section of the remainder of the structure shown in Fig. 6, the section being in the three planes indicated by the line $z\,z$; Fig. 8, a perspective of one of the partitions of the mold-frame, and Fig. 9 a perspective of the side and end facings of each of the molds.

Similar reference-numerals designate like parts in the several views.

This machine resembles in its main features and in the principle of its action the brick-machine which is described in Letters Patent numbered 390,110, granted September 25, 1888, the object of each invention being to compress the clay by a series of continuous pressings, moving the mass of clay in each of the molds bodily to and fro from one portion of the mold to another several times during the operation, and compressing the clay further with each successive pressing until the masses of clay in the molds are finally converted into the form desired. By this treatment more air is expelled from the clay than it is possible to expel from it by a single pressing of uniform intensity, no matter how forcible it may be, or by merely applying heavy pressure to the mass of clay in each mold without changing the position of the whole mass with respect to the lateral faces of the mold by other means besides the pressure used to consolidate it.

Figure 1:
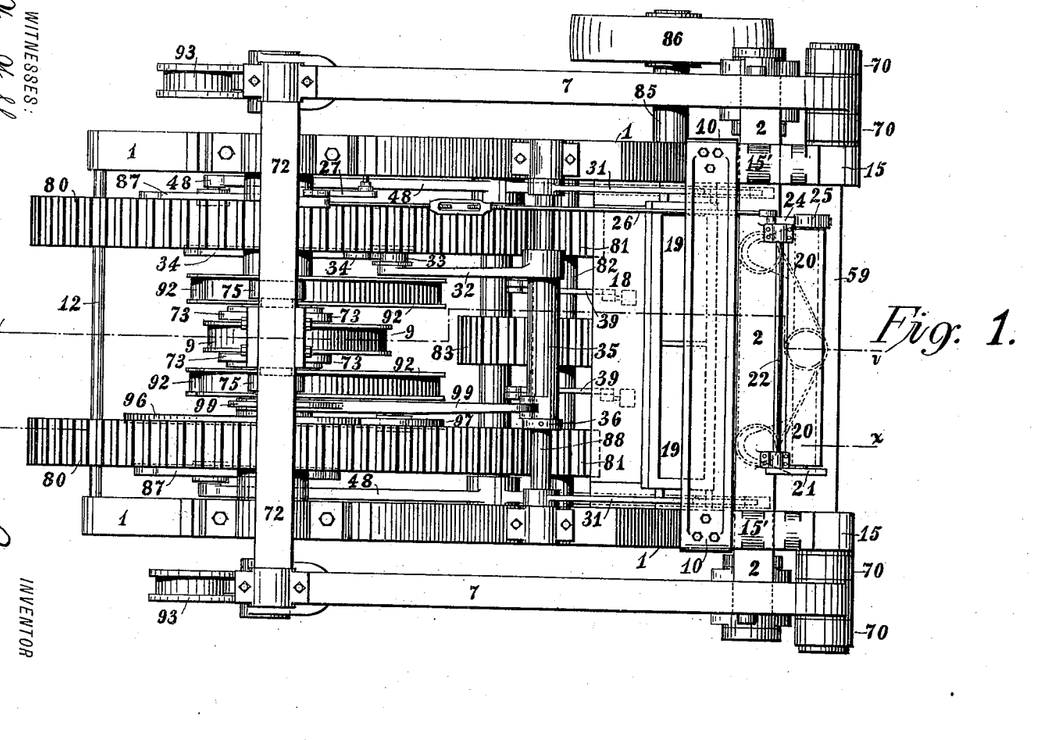
Figure 1 is a plan of a brick-machine embodying the invention.
Figure 2:
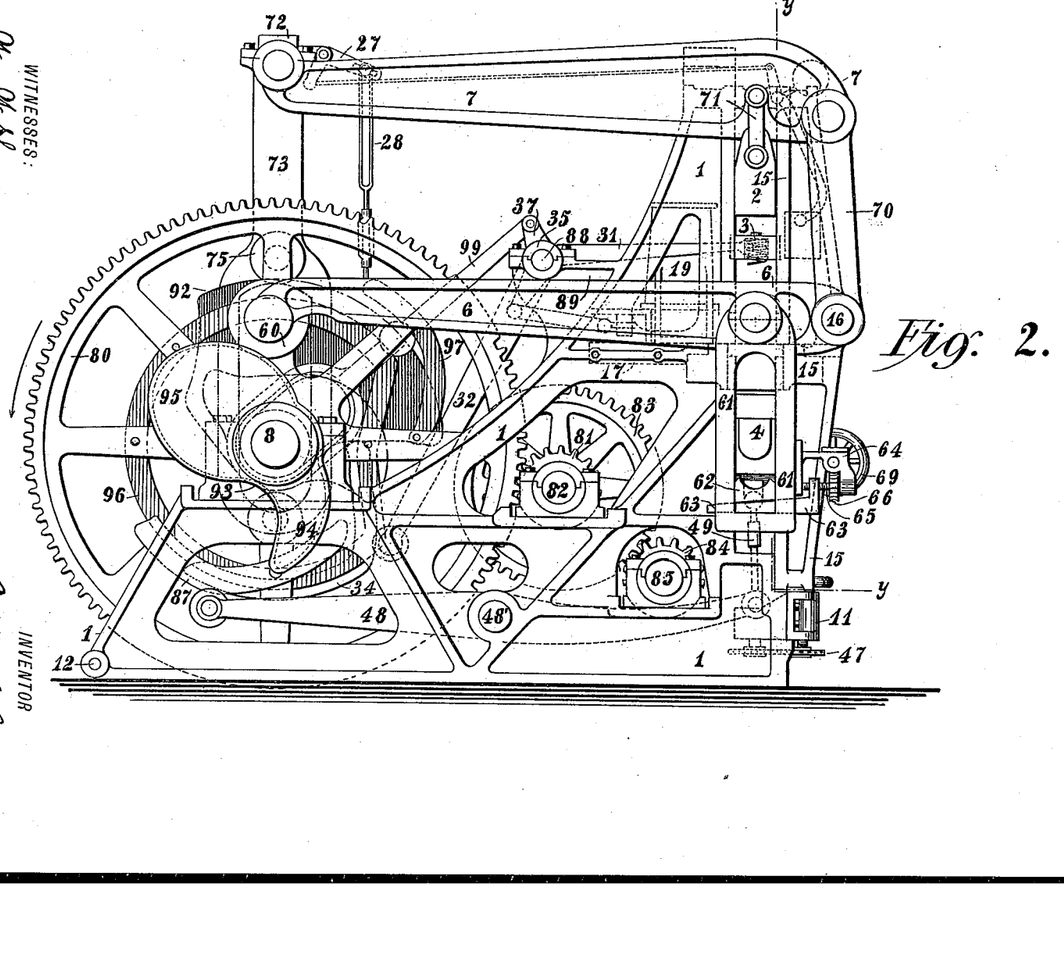
Fig. 2, a side elevation thereof.
Figure 3:
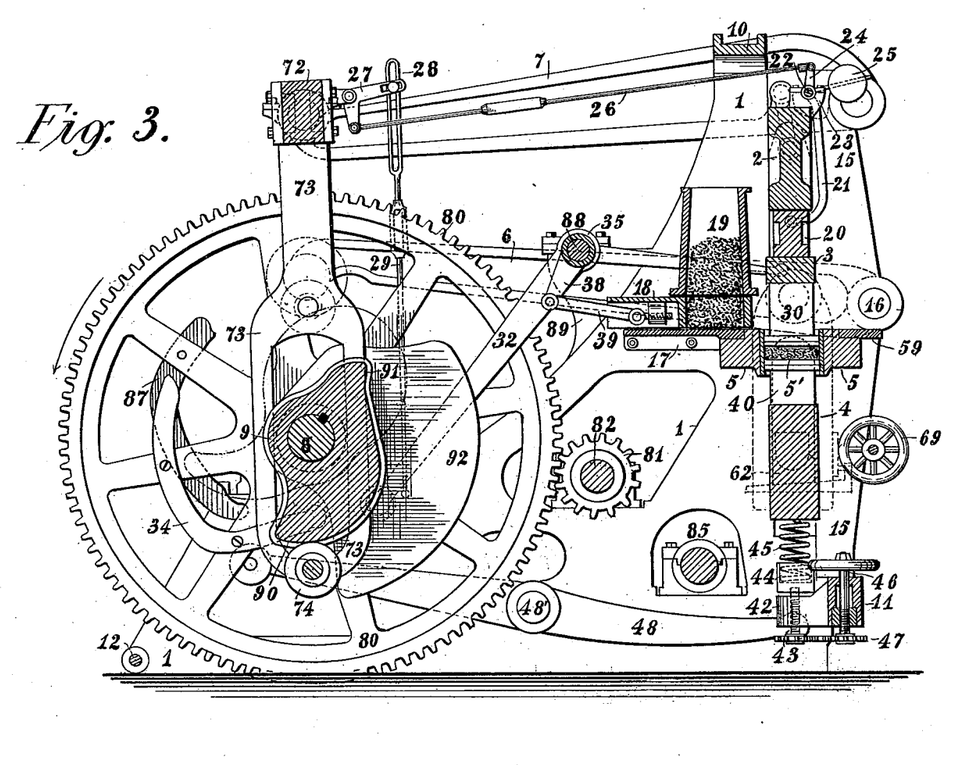
Fig. 3, a vertical section on the line $v\,v$, Fig. 1.
Figure 4:
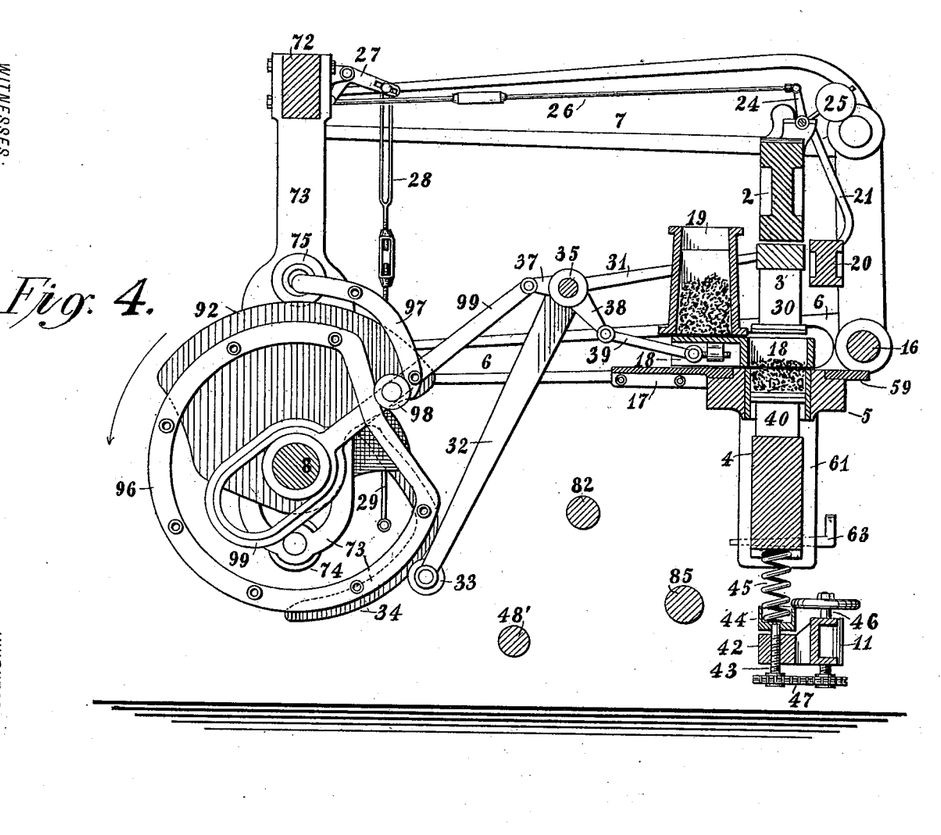
Fig. 4, a detail in a vertical plane on the line $x\,x$, Fig. 1.
Figure 5:
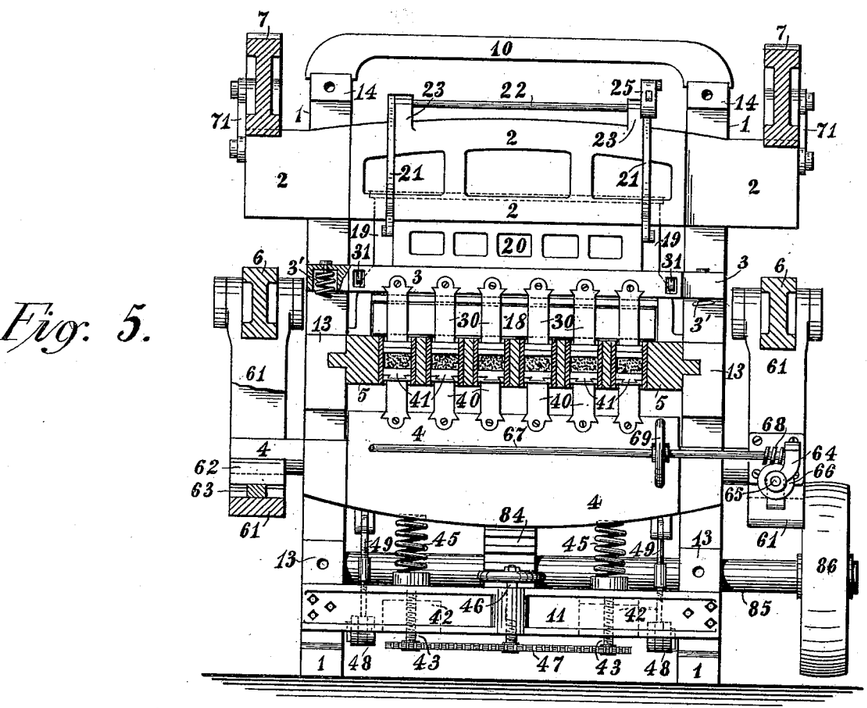
Fig. 5, a front sectional elevation, the section being on the line $y\,y$, Fig. 2.

This invention pertains to the construction of several parts of the machine herein described and to their combination with other parts, and it renders this machine not only mechanically better than that which was patented in the above-mentioned patent, but also capable of doing better work than that machine could do, the clay being subjected in the new machine to six degrees of pressure, whereas in the other only five could be imparted to it, and the action of the new machine being improved in other respects, as will appear from the following description:

The foundation of the machine is represented in the drawings by the shading at the base of each of the figures numbered 2, 3, 4, and 5; and on this foundation rest the uprights 1, which form parts of the frame of the machine, top and front views of these uprights being shown in Figs. 1 and 5, respectively, and side views in Figs. 2 and 3. The main portion of the frame is composed of the uprights 1, together with the top cross-beam 10, Figs. 1, 3, and 5, and front cross-beam 11, Figs. 5, 2, and 3, fastened to the uprights by screw-bolts, and the tie-rod 12, secured in the uprights close to their rear extremities, as appears in Figs. 1, 2, and 3. The four face-surfaces 13 of the uprights, Fig. 5, are in the same vertical plane, and the surfaces 14, Fig. 5, are in another vertical plane behind that of the surfaces 13. The rest of the frame, which is the portion in front of the main portion, is composed of the two sections 15, Figs. 1, 2, and 3, which are bolted to the uprights 1. These sections are in contact with the surfaces 13 of the uprights and with blocks 15', whose rear faces rest against the surfaces 14 of the uprights, these blocks being held in their proper positions by two of the bolts which fasten the sections 15 to the main portion of the frame.

The main and front portions of the frame together form two pairs of vertical guides, one pair being directly above the other. In the upper guides are the cross-beam 2 and the upper ram-beam 3, and in the lower guides is the lower ram-beam 4. The molds, which are located between the upper and lower ram-beams, are in a frame 5, which is supported at its ends by the frame of the machine by means of tongues and grooves, as indicated in Fig. 5, or by other means which will enable it to be easily removed from and replaced in its proper position. To the upper and lower ram-beams are secured the rams 30 and 40, respectively, the upper ends of the rams 40 being within the molds and the lower ends of the rams 30 being either within or directly over the molds, according to the position of the upper ram-beam. The rams 40 are faced with plates 41, which are dovetailed to the parts of the rams below them, as indicated in Fig. 5, these plates being adapted to move on their beds so as to equalize the wear upon their ends and to help prevent the rams from binding in the molds. In the front portion of the frame are stationary pins 16, which project outward from the sides of the frame. These pins form the fulcrums of two heavy levers 6, which are provided at their rear ends with rollers 60. Links 61 are pivoted to these levers near their fulcrums 16, and in these links are bearing-blocks 62, which have concave faces and are adjustable vertically by means of wedges 63. These wedges are provided with screw-threaded projections at their front ends, and on the faces of the links 61 are brackets 64, in which are screws 65, which pass through the projections of the wedges and on which are fastened worm-wheels 66. In the brackets 64 is mounted a shaft 67, which is provided with worms 68, that engage the worm-wheels 66, and with a hand-wheel 69. Thus the wedges may be moved inward or outward at pleasure by turning the hand-wheel 69. The lower ram-beam 4 extends through the links 61, its under surfaces next to its ends being convex and of the proper curvature to fit the concave surfaces of the bearing-blocks, in which the beam is adapted to rest during a part of each operation. On the back of the cross-beam 11 are projections 42, Figs. 3 and 5, in which are screws 43, on whose upper ends are cups 44, which contain the lower ends of heavy coil-springs 45, the upper ends of these springs bearing against the bottom of the ram-beam 4, and in the cross-beam 11 is a screw 46, at the upper end of which is a hand-wheel. On the lower ends of these three screws are sprocket-wheels, around which passes an endless chain 47. The springs 45 sustain the weight of the ram-beam 4 and rams 40 and elevate the beam from the bearing-blocks 62, except when it is driven down upon the blocks by a force greater than the sustaining force of the springs. The beam is thus held at a distance above the bearing-blocks and the rams 40 are held at a distance from the top of the molds depending on the adjustment of the springs, which is effected by turning the screw 46. Levers 48 are mounted on a shaft 48' close to the inner faces of the uprights 1, and to their front ends, which project under the ram-beam 4, are pivoted adjustable links 49, which are also pivoted to lugs on the bottom of the ram-beam. These levers, which have rollers at their rear ends, and the links 49 are adapted to raise the beam 4 until the faces of the rams 40 are flush with the tops of the molds.

Directly above each of the heavy levers 6 is another heavy lever 7. Each of the levers 7 is connected at its front end by a pair of links 70 to one of the pins 16. These levers bear upon the cross-beam 2, each having a concave surface, fitting upon a convex surface on the cross-beam. The cross-beam is connected to the levers by links 71, as appears by Figs. 2 and 5. The rear ends of these levers are connected together by a heavy beam 72, which is pivoted between them.

A block 20, termed an "uptake," is secured to the cross-beam 2 by means of the curved links 21, to the lower ends of which the uptake is pivoted, as appears by Figs. 2, 3, 4, and 5, and which are themselves fastened at their upper ends on a shaft 22, which has bearings in brackets 23 on the cross-beam. On one of these links is a crank-arm 24, whereby the shaft may be turned on its axis, and on the link, in front of the arm 24, is another arm, on which is a counterweight 25, so arranged that it tends to move the lower ends of the links backward. An adjustable rod 26 extends from the crank-arm 24 to one of the arms of a bell-crank 27, whose fulcrum is on a bracket which projects from the beam 72. The other arm of the bell-crank is slotted, and in it is a pin, which extends through a link 28, this link being connected by a turnbuckle with a rod 29, which is pivoted at its lower end to the frame of the machine. The links 21 are so arranged with respect to the cross-beam 2 and uptake 20 that they allow the uptake to rest either directly under the cross-beam 2, between that beam and the ram-beam 3, as shown in Figs. 3 and 5, or in front of the ram-beam 3, as appears by Figs. 2 and 4.

On a shaft 8, which is mounted in bearings on the rear part of the frame, are two large master-wheels 80, which are keyed to the shaft. These are gear-wheels, and they are engaged by pinions 81 on a shaft 82, on which shaft is a gear-wheel 83 between the pinions 81. The gear 83 is engaged by a pinion 84 on a shaft 85, which is the driving-shaft, and on one end of which is a belt-wheel 86. When the machine is operated, the master-wheels 80 turn in the direction indicated by the arrow on the left of Fig. 2.

On the shaft 8, midway between the sides of the machine, is keyed a cam 9, Fig. 3, which is composed of the two parts or horns 90 and 91. A yoke 73, which is secured to the beam 72, extends downward on each side of this cam, as appears by Fig. 1, the shaft 8 passing through the yoke, and between the branches of the yoke, under the shaft 8, is a roller 74, on which the cam 9 acts, and on each side of this yoke, above the shaft 8, is a roller 75. Directly under the rollers 75 are twin cams 92, Figs. 1, 2, 3, and 4, which are also keyed on the shaft 8. By the action of the cam 9 on the roller 74 the rear ends of the levers 7 are depressed, and by the action of the cams 92 on the rollers 75 the rear ends of these levers are raised. The shaft 8 projects beyond the sides of the frame, and on it, next to its ends, are keyed twin cams 93, Figs. 1 and 2, on which the rollers 60 of the levers 6 constantly rest and which are adapted to act on those rollers. Each of these cams is composed of the two parts or horns 94 and 95. The cams 9, 92, and 93 are fastened on the shaft 8 in the relative positions in which they are shown. On the outer side of each of the master-wheels 80 is fastened a curved projection 87, and these projections, together with the wheels, constitute cams which act on the rollers at the rear ends of the levers 48.

A shaft 88 is journaled in brackets 89, which are parts of the uprights 1, and on this shaft arms 31 are fastened, which project forward therefrom and enter slots in the upper rambeam 3, Figs. 1, 2, 3, and 4, and on this shaft is also fastened another arm 32, which extends behind and downward from the shaft and is provided at its lower end with a roller 33, and on the inside of the master-wheel 80, which is adjacent to this arm, is a projection 34, which, with the wheel, constitutes a cam that acts upon the roller 33, moving the lower end of the arm 32 toward the front of the machine and raising the ram-beam 3 by means of the arms 31.

A platform 17, bolted at its ends to the uprights 1 and having its upper surface flush with that of the mold-frame 5, forms, with the mold-frame, a support for the mold-charger 18 and the hopper 19. The mold-charger consists of a device having in it a series of chambers in which the clay is conveyed to the molds from the hopper, the rear part of the mold-charger being adapted to close the bottom of the hopper when the mold-charger moves forward. Movement is imparted to the mold-charger by the double-acting cam 96 and 97, Fig. 4, whose parts are fastened to one of the master-wheels 80 on the inside of the wheel. This cam acts on a roller 98, which is carried by a link 99. The rear and lower part of this link consists of an eye which surrounds and bears upon the hub of the cam 92, which is next to the link, and on the shaft 88 is a loose sleeve 35, which is confined between the arm 32 and collar 36, Fig. 1, and provided with an arm 37, to which the upper end of the link 99 is pivoted. This sleeve is also provided with arms 38, to which are pivoted links 39, which are pivoted at their front ends to the mold-charger.

Figures 6, 7, 8, 9:
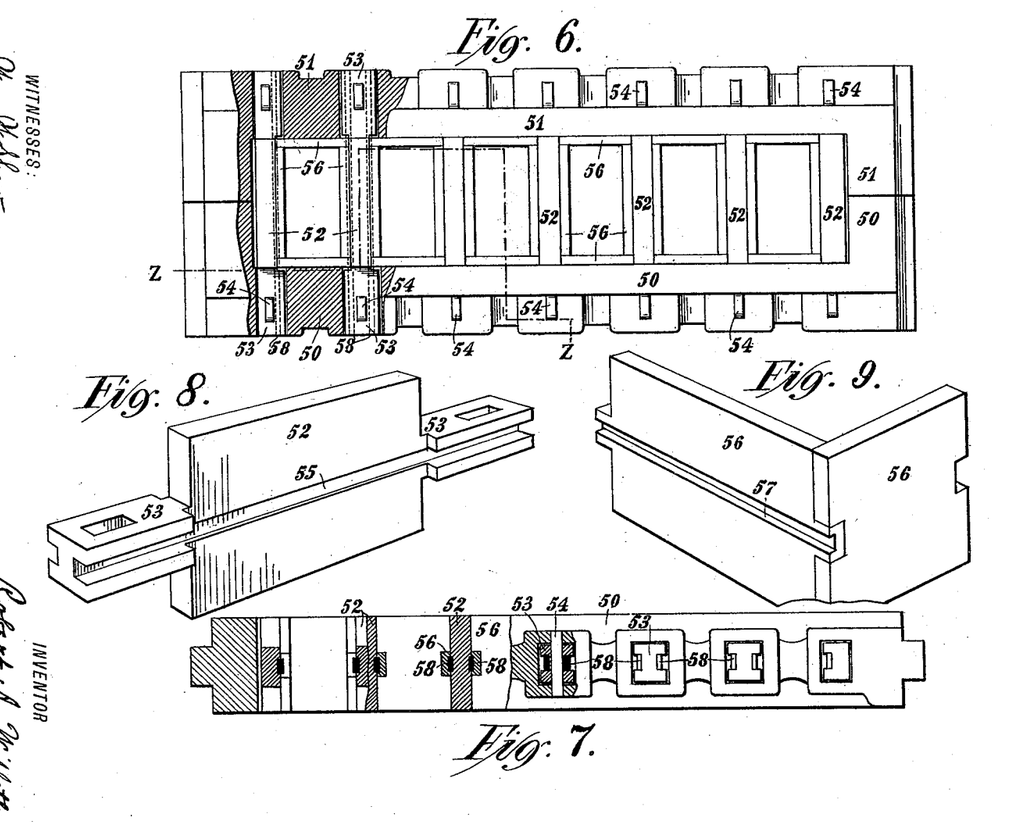

The mold-frame 5 consists of two symmetrical parts 50 and 51, Fig. 6, and partitions 52. Each of these partitions has projections 53 on its ends, which projections extend through openings in the parts 50 and 51, as represented in Fig. 7, and in the parts 50 and 51 and in the projections 53 are keyways, in which are inserted keys 54. In the inner face of each of the end partitions and in each face of each of the others is a groove or way 55, which also extends through the projections 53 and which is midway between the top and bottom of the partition. The face-plates or facings 56 of each mold are fitted to one another, as represented in Fig. 9, the side facings having projections which enter recesses in the end facings, and in the outside of each of the side facings and midway between its upper and lower edges is a groove or way 57, similar to those in the partitions. The facings are placed in the recesses of the mold-frame, as shown in Fig. 6, and feathers 58 are inserted in the grooves 55 and 57 of the partitions and facings, each feather lying partly in the partition and partly in the facing, as indicated by dotted lines near the left of Fig. 6. By means of this construction of the mold-frame and molds the use of bolts, it will be observed, is avoided and the facings of the molds are kept in their proper positions, notwithstanding the tendency of the rams and clay to move them up and down during the operation of the machine, while it is easy to replace them with others when brick of a different form are to be made.

In front of the upper part of the mold-frame is a plate 59, forming a narrow table whose upper surface is flush with the top of the mold-frame and whose ends abut against the inner faces of the front portion of the frame of the machine.

In describing the operation of the machine let it be assumed at the start that the clay in the molds is undergoing the final pressing of the series. The various parts of the machine are then in the respective positions indicated by Fig. 3, the rear ends of the levers 7 being drawn downward to about the limit of their downward movement by the action of the horn 90 of the cam 9 upon the roller 74 and exerting pressure through the cross-beam 2, uptake 20, ram-beam 3, and rams 30 upon the clay and the rear ends of the levers 6 being raised to about the limit of their upward movement by the action of the horns 95 of the cams 93 upon the rollers 60 and exerting pressure upon the clay through the links 61, bearing-blocks 62, lower ram-beam 4, and rams 40. Just as the horn 90 passes the roller 74 the cams 92 make contact with the rollers 75 and elevate the rear ends of the top levers until they reach their highest position, being that in which they are shown in Fig. 2, and they are held in that position by the cams 92 while the molds are being recharged. Just before the rear ends of the levers 7 reach their highest position the upward movement of that end of the bell-crank 27 to which the link 28 is secured is arrested by the contact of the pin in the bell-crank with the top of the link 28, and as the beam 72 moves farther upward the bell-crank is turned on its pivot and draws the rod 26 backward, whereby the lower ends of the links 21 are moved forward, and the uptake 20 is carried bodily by them from underneath the beam 2 to the position in which it is shown in Fig. 4. Just as the uptake clears the upper ram-beam 3 the cams 87 act upon the rollers of the levers 48, depressing the rear ends and elevating the front ends of those levers, and the lower ram-beam 4 and rams 40, together with the blocks 5' of compressed clay upon those rams, are thus raised until the faces of the rams 40 are flush with the top of the mold-frame. The weight of the upper ram-beam and rams remains on the blocks 5' until the faces of the rams 30 pass or are about to pass above the top of the molds, whereupon the cam 34 acts upon the roller 33 and the ram-beam 3 and rams 30 are lifted from the clay and carried by the arms 31 to the position indicated in Fig. 4, where they are held by the cam 34 during a short interval. Then the various parts of the machine are in the respective positions in which they are shown in Fig. 2. The next moment the cam 96 and 97, acting on the roller 98, retracts the link 99 and turns the sleeve 35, and the mold-charger, its chambers being filled with clay, is moved forward through the action of the arms 38 and links 39 to the position in which it appears in Fig. 4, the chambers of the charger then being directly over the molds. The blocks of compressed clay are pushed out upon the table 59 by the front of the mold-charger as it advances. Before the end of this movement of the mold-charger, but after the blocks 5' of compressed clay have been pushed forward so far that they cannot fall back into the molds, the cams 87 leave the rollers of the levers 48, and the lower ram-beam 4 and rams 40 thereupon descend by gravity until the beam rests upon the springs 45 and the loose clay in the mold-charger descends on the rams 40 into the molds. The link 99 is then advanced by the cam 96 and 97 acting on the roller 98, and the mold-charger is drawn backward under the hopper to its former position. The mold-charger being clear of the rams 30, the cam 34 then leaves the roller 33, and the upper ram-beam being no longer supported by the arms 31 the rams 30 descend upon the clay in the molds, which is then subject to the pressure exerted by the weight of the rams 30 and the ram-beam 3, this weight being sufficient to compress the springs 45 slightly and to move the masses of clay in the molds bodily downward through a short distance. This is the first pressing of the series. An instant after the cam 34 leaves the roller 33 the faces of the cams 92 pass behind the rollers 75 and the rear ends of the levers 7 descend. As soon as the bell-crank 27 is freed from the restraint of the link 28 the lower ends of the links 21 move inward, being actuated by their own weight and that of the uptake 20 and the counterweight 25, and the uptake assumes the position in which it is shown in Fig. 3 under the cross-beam 2, and the cross-beam and uptake then descend together until the uptake rests on the top of the upper ram-beam 3, and the weight of the uptake, the cross-beam 2, the rear portions of the levers 7, and of the beam 72 and yoke 73, acting on the levers, in addition to the weight of the ram-beam 3 and rams 30, is imposed on the clay in the molds. This weight is greater than that which the springs 45 will sustain, so that not its entire force, but only enough of it to compress the springs 45, is exerted immediately upon the clay, the springs being compressed by it until the ram-beam 4 rests in the bearing-blocks 62 and the masses of clay in the molds being moved bodily downward a second time. The pressing just described is the second of the series. The full force of the weight now on the clay is exerted when the ram-beam 4 rests in the bearing-blocks 62, the rear ends of the levers 6 then being in their lowest positions and the horns 94 of the cams 93 being about to act on the rollers 60 of those levers, and the pressing thus effected is the third of the series. The horns 94 of the cams 93 then act upon the rollers 60 of the levers 6, raising the links 61, and with them the lower ram-beam and rams, together with the clay in the molds and the weight then upon the clay, the force exerted upon the clay by the lower rams then being sufficient not only to support the weight on the clay, but also to overcome the friction produced in raising the weight. This pressure is the fourth of the series. When the horns 94 of the cams 93 have raised the rear ends of the levers 6, as just described, through about half of the whole movement imparted to them by these horns, then the horn 91 of the cam 9 acts for a moment upon the roller 74, depressing the rear ends of the levers 7 during the upward movement of the levers 6. By this means another pressing is effected, which is the fifth of the series. This pressing is followed by three movements of the clay in the molds, the first being a short upward movement produced by the further action of the horns 94 of the cams 93 on the levers 6, the second a downward movement due to the descent of the rear ends of the levers 6 to their lowest positions when the horns 94 of the cams 93 pass behind the rollers 60, and the third an upward movement due to the action on the rollers 60 of the other horns 95 of the cams 93, and during these movements there is imposed on the clay the combined weight of the upper rams, the ram-beam 3, the uptake, the cross-beam 2, the rear portion of the levers 7, and the beam 72 and yoke 73, acting on the levers 7. The downward movement of the clay just described terminates abruptly, causing the weight upon the clay to act on it with an impulse like that of a blow. While the horns 95 of the cams 93 are yet raising the rear ends of the levers 6, the horn 90 of the cam 9 acts on the roller 74 and by the united action of these horns of the cams upon the levers the masses of clay in the molds are reduced to their permanent form, the rear ends of the levers 6 being raised and those of the levers 7 being depressed simultaneously. During this final pressing, the sixth of the series, the parts of the machine return to the relative positions in which they were assumed to be on starting to describe the operation and in which they appear in Fig. 3.

In the ram-beam 3, close to its outer ends, are secured coil-springs 3', which prevent the rams 30 from striking the rams 40 if the ram-beam 3 is allowed to fall when the molds are empty, the springs 3' then making contact with the frame when the rams 30 are a short distance above the lower rams. The fifth and sixth pressings being produced by the upward movement of the rear ends of the levers 6 and downward movement of the rear ends of the levers 7 simultaneously, the pressure then exerted on the clay in the molds is obviously double-acting, each row of rams being then forced positively toward the other. Hence this pressure differs from any which is imparted to the clay by the other machine hereinbefore mentioned, one of the rows of rams of that machine being always stationary when the other row is impelled toward it either by the cam which depresses the upper power-levers or by the cams which raise the lower power-levers.

The length of the first two downward movements of the clay in the molds being those imparted to it during the first and second pressings is about two inches, that of the next movement, which is upward and which occurs in the fourth and fifth pressings and immediately after the fifth, is about two inches, that of the next movement, which is downward and which occurs between the fifth and sixth pressings, is almost two inches, and that of the last movement, which is upward and which occurs just before the sixth pressing, is about two inches. These movements, aggregating in length about eight inches and the series of pressings above described, deprive the clay of more air than is commonly expelled from it by any other machine, and thus enable brick of a superior quality to be produced.

Having thus described my invention, what I claim as new, and desire to secure by Letters Patent, is—

1. In a brick-machine the combination of a stationary mold or row of stationary molds, a pair of rams for each mold adapted to compress the clay between them, and mechanism adapted to impart to the rams of each pair a plurality of distinct double-acting movements, and to change the position in the mold of the whole mass of clay under pressure, in each complete operation of the machine upon the clay, each double-acting movement being composed of simultaneous movements of both rams of the pair toward each other, substantially as described.

2. In a brick-machine the combination of a stationary mold or row of stationary molds, a pair of rams for each mold adapted to compress the clay between them, levers and complemental devices adapted to transmit power from cams to the rams, and cams adapted to impart to the rams of each pair a plurality of distinct double-acting movements, and to change the position in the mold of the whole mass of clay under pressure, in each complete operation of the machine upon the clay, each double-acting movement being composed of simultaneous movements of both rams of the pair toward each other, substantially as described.

3. In a brick-machine the combination of a mold or row of molds, a pair of rams for each mold adapted to compress the clay between them, levers and complemental devices adapted to transmit power from cams to the rams, and cams adapted to actuate the levers and rams, each cam being provided with two horns and the cams being properly arranged to impart to the rams of each pair successive double-acting movements, in the operation of compressing the clay, substantially as described.

4. In a brick-machine the combination of a mold or row of molds, a pair of rams for each mold adapted to compress the clay between them, levers and complemental devices adapted to transmit power to the rams, and cams adapted to actuate the levers and rams, the cams being on a single shaft and being properly formed and arranged to impart to the rams of each pair successive double-acting movements, with each revolution of said shaft, a double-acting movement being composed of simultaneous movements of both rams of the pair toward each other, substantially as described.

5. In a brick-machine the combination of a ram-beam having a ram or row of rams projecting downward therefrom, a mold or row of molds below the ram-beam, the cross-beam 2 above the ram-beam, an uptake 20 adapted to rest in contact with the bottom of the cross-beam and movable bodily away from the cross-beam to a place where it is out of contact therewith, mechanism to convey the uptake to and from its operative position in contact with the bottom of the cross-beam, levers adapted to actuate the cross-beam, and mechanism to raise the ram-beam and hold it in the place of the uptake under the cross-beam, substantially as described.

6. In a brick-machine the combination of the cross-beam 2, an uptake 20 adapted to rest in contact with the bottom of the cross-beam and movable bodily away from the cross-beam to a place where it is out of contact therewith, mechanism to convey the uptake to and from its operative position in contact with the bottom of the cross-beam, levers adapted to actuate the cross-beam, and devices which act on the clay and which are actuated by power transmitted by the uptake from the cross-beam, substantially as described.

7. In a brick-machine the combination of a cross-beam 2, an uptake 20 secured by links to the cross-beam and adapted to rest in contact with the bottom of the cross-beam, mechanism whereby the uptake suspended by the links is swung bodily out of and back into its operative position under the cross-beam, levers adapted to actuate the cross-beam, and devices which act on the clay and which are actuated by power transmitted by the uptake from the cross-beam, substantially as described.

8. In a brick-machine the combination of a cross-beam 2, an uptake 20, links 21 pivoted at their lower ends to the uptake and at their upper ends to the cross-beam, a crank-arm 24, a counterweight 25, a rod 26 and actuating mechanism connected therewith, levers adapted to actuate the cross-beam, and devices which act on the clay and are actuated by power transmitted by the uptake from the cross-beam, substantially as described.

9. In a brick-machine the combination of the levers 7, the cross-beam 2 connected to the levers, the uptake 20, the links 21, the shaft 22, the crank-arm 24, the counterweight 25, the rod 26, the bell-crank 27, a support to which the bell-crank is pivoted and which is attached to the levers 7, the link and rod 28 and 29, the rod being pivoted at its lower end to the frame, and devices which act on the clay and are actuated by power transmitted by the uptake from the cross-beam, substantially as described.

10. In a brick-machine the combination with levers 6 provided with rollers 60, levers 7, and mechanism actuated by said levers, of the beam 72, yoke 73 provided with a roller 74, shaft 8, cam 9 having the horns 90 and 91, cams 93 having the horns 94 and 95, and mechanism to rotate the shaft 8, said cams being properly arranged to force the rear ends of the levers 6 and the rear ends of the levers 7 toward each other in a succession of simultaneous movements, during each revolution of the shaft 8, substantially as described.

11. In a brick-machine the combination of levers 6 provided with rollers 60, levers 7, and mechanism actuated by said levers, of the beam 72, yoke 73 provided with rollers 74 and 75, shaft 8, cam 9 having the horns 90 and 91, cams 93 having the horns 94 and 95, cams 92, and mechanism to rotate the shaft 8, the cams 9 and 93 being properly arranged to force the rear ends of the levers 6 and the rear ends of the levers 7 toward each other in a succession of simultaneous movements, during each revolution of the shaft 8, substantially as described.

12. In a brick-machine the combination of a movable mold-charger, the shaft 88, the sleeve 35 loose on this shaft and provided with arms 38 and an arm 37, the links 39 pivoted to the arms 38 and to the mold-charger, the shaft 8, the link 99 provided with a roller 98 and having an eye which surrounds the shaft 8, the double-acting cam 96 and 97 carried by the shaft 8 and adapted to act on the roller 98, and mechanism to rotate the shaft 8, substantially as described.

13. In a brick-machine the combination of the levers 7, the links 70 pivoted to the levers at their front ends, and to the frame of the machine by pins 16, the cross-beam 2 and mechanism actuated thereby, and the links 71, the levers being adapted to bear upon the cross-beam, and the levers and cross-beam having concave and convex surfaces of contact, substantially as described.

14. In a brick-machine the combination of the ram-beam 3 with the rams 30 secured thereto, the mold-charger 18, the shaft 88, the arms 31 fixed on the shaft and adapted to support the ram-beam, the sleeve 35 loose on the shaft 88 and provided with arms 38 and an arm 37, the links 39 pivoted to the arms 38 and to the mold-charger, the shaft 8, the master-wheels 80 on the shaft 8, the cam 34 on one of the master-wheels, the double-acting cam 96 and 97 on the other master-wheel, the arm 32 fastened to the shaft 88 and adapted to be actuated by the cam 34, the link 99 pivoted to the arm 37 of the sleeve 35 and provided with a roller 98 on which the cam 96 and 97 bears and having an eye surrounding the shaft 8, and mechanism to rotate the shaft 8, the cam 96 and 97 being arranged to advance the mold-charger immediately after the cam 34 actuates the arm 32, substantially as described.

15. In a brick-machine a mold or molds comprising the combination of a mold-frame, mold-facings inclosed in the mold-frame, and removable feathers 58 which extend across the mold-frame and engage the mold-facings; the mold-frame having in it a recess for each mold and having openings in its sides, and the mold-facings of each mold being within the recess in the mold-frame and being removable from the mold-frame fixed in the machine, and the feathers being adapted to be passed through the openings in one side of the mold-frame out of and into engagement with the mold-facings, substantially as described.

16. In a brick-machine a mold or molds comprising the combination of a mold-frame, mold-facings inclosed in the mold-frame, and feathers 58 inserted in the mold-frame and in the mold-facings; the mold-frame having in it a recess for each mold and having openings in its sides and grooves 55 in the sides of the recess, and the mold-facings of each mold being within the recess in the mold-frame and being removable from the mold-frame fixed in the machine, and two of the facings having projections and the other two having recesses, at their ends, the projections and recesses engaging with each other, and two of the facings having grooves 57 in their backs, and the feathers being inserted in the grooves 55 and 57 and being adapted to be passed through the openings in one side of the moldframe out of and into said grooves, substantially as described.

17. In a brick-machine a row of molds comprising a frame having partitions containing grooves 55, and facings inclosed in the frame, two of the facings of each mold having projections at their ends which enter recesses in the other two facings and having grooves 57 in their backs, the facings being secured in the frame by feathers 58 inserted in the grooves 55 of the partitions and 57 of the facings, substantially as described.

18. In a brick-machine a row of molds composed of the parts 50 and 51, the partitions 52 having the projections 53 in the grooves 55, the keys 54, the facings 56, the side and end facings of each mold being secured together at the corners of the mold and the side facings having grooves 57 in their backs, and the feathers 58 inserted in the grooves 55 and 57 of the partitions and facings, substantially as described.

ROBERT A. WILLETT.

Witnesses:
CHAS. COLEMAN MILLER,
ARTHUR F. THOMPSON.

Correction in Letters Patent No. 621,728.

It is hereby certified that in Letters Patent No. 621,728, granted March 21, 1899, upon the application of Robert A. Willett, of New York, N. Y., for an improvement in "Brick-Machines," an error appears in the printed specification requiring correction, as follows: In line 18, page 7, the word "in" should read *and;* and that the said Letters Patent should be read with this correction therein that the same may conform to the record of the case in the Patent Office.

Signed, countersigned, and sealed this 4th day of April, A. D., 1899.

[SEAL.]
              WEBSTER DAVIS,
              *Assistant Secretary of the Interior.*

Countersigned:
 C. H. DUELL,
  *Commissioner of Patents.*